United States Patent [19]

Pietzsch et al.

[11] 4,159,856

[45] Jul. 3, 1979

[54] RUNNING PAD FOR AN ENDLESS TRACK

[75] Inventors: Ludwig Pietzsch, Rittnertstrasse 36, D-7500 Karlsruhe, Fed. Rep. of Germany; Harald Kauer, Ettlingen; Rudolf Hartmann, Karlsbad-Auerbach, both of Fed. Rep. of Germany

[73] Assignee: Ludwig Pietzsch, Karlsruhe, Fed. Rep. of Germany

[21] Appl. No.: 859,814

[22] Filed: Dec. 12, 1977

[30] Foreign Application Priority Data

Dec. 21, 1976 [DE] Fed. Rep. of Germany ....... 2657906

[51] Int. Cl.² .............................................. B62D 55/28
[52] U.S. Cl. .............................................. 305/51
[58] Field of Search .................. 305/51, 55, 35 R, 36, 305/38, 42

[56] References Cited

U.S. PATENT DOCUMENTS

| | | | |
|---|---|---|---|
| 3,520,574 | 7/1970 | Wiesner | 305/38 |
| 3,870,380 | 3/1975 | Korner | 305/36 |

Primary Examiner—John P. Shannon

[57] ABSTRACT

A running pad for an endless track is disclosed, including resilient retaining projections which extend away from opposite sides of the running pad and are adapted to enter into locking engagement, at their free ends, in recesses formed in the respective chain links. The retaining projections are formed by the ends of a unitary resilient plate that extends through said running pad and is designed to yield elastically in a direction toward and away from the recesses of the chain link in order to allow simple and quick assembly of the running pad at the chain link in a direction vertical to the tread surface without the need of disassembly of the chain link.

5 Claims, 3 Drawing Figures

U.S. Patent  Jul. 3, 1979  4,159,856
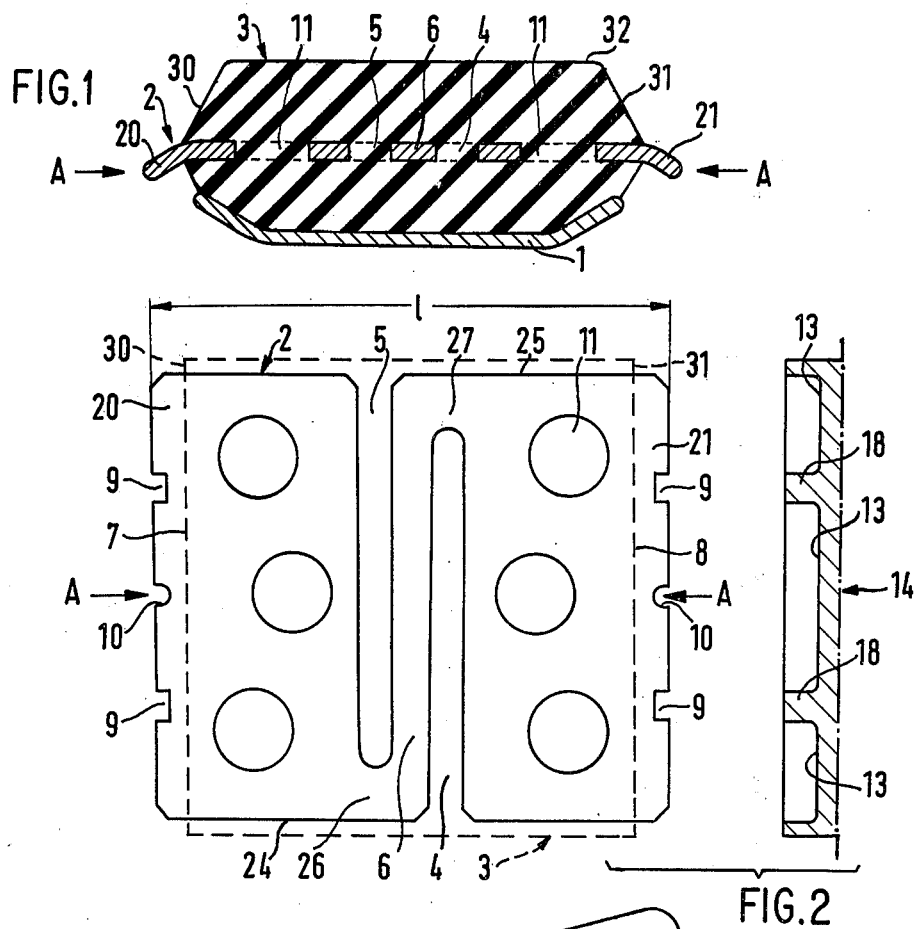
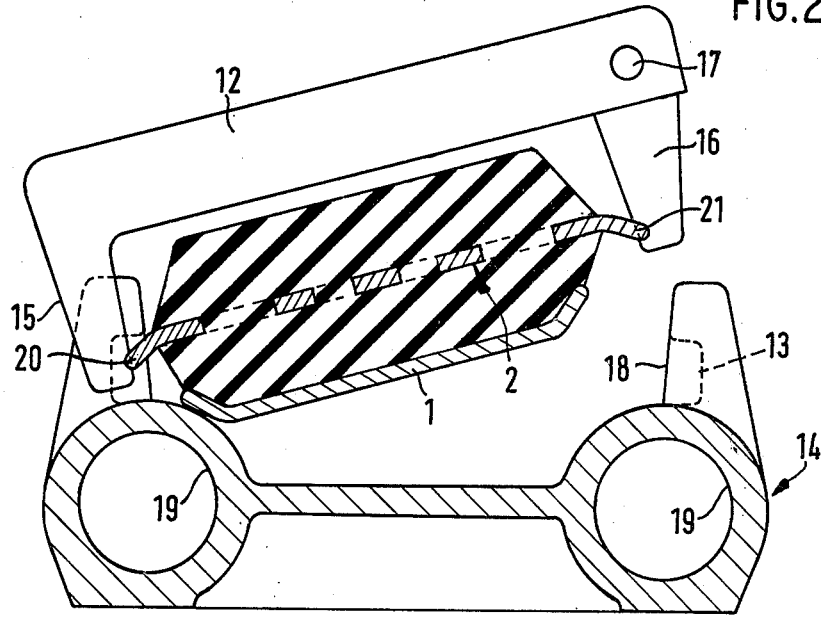
FIG. 3

RUNNING PAD FOR AN ENDLESS TRACK

BRIEF DESCRIPTION OF THE PRIOR ART

The invention relates to a running pad for an endless track, with resilient retaining projections extending away from opposite sides of the running pad and adapted to enter into locking engagement, at their free ends, in recesses formed in the chain link in a direction vertical to the tread surface, for assembly of the running pad.

A running pad of the kind in question is known which has each retaining projection formed at a separate retainer element. Each retainer element is firmly connected to a part of the running pad, e.g. by a screw connection or by vulcanization (German patent No. 1 143 727).

Assembly of the running pad in a direction perpendicular to the tread surface is convenient particularly in case of endless tracks of which each chain link comprises more than two tubular bodies through which the customary connecting bolts extend that are connected with the next successive chain link by connectors. If the endless track, for instance, comprises three tubular bodies, an exchange of the running pad of the central tubular body does not require disassembly of that tubular body as is necessary with known running pads which are assembled by being pushed into position transversely of the running direction (German patent No. 1 206 325).

SUMMARY OF THE INVENTION

It is the object of the invention to provide a running pad of the kind initially defined which can be produced at minor expenditure and is adapted for simple and quick exchange by virtue of its design in accordance with load requirements.

To solve the problem specified it is provided, in accordance with the invention, that the resilient retaining projections form the ends of a unitary resilient plate extending through the running pad and designed to yield elastically in a direction towards and away from said recesses.

Preferably the elastic yielding property of the spring plate, required for assembly, is achieved by the fact that the resilient plate which is designed as an essentially plane spring plate comprises at least one weakened zone which permits elastic deformation of the plate portions it connects.

In an advantageous embodiment of the invention the weakened zone is obtained by the provision of at least one weakened portion each at opposite edges of the spring plate as seen in running direction and by the fact that the weakened portions are interconnected by an easily deformable web which extends transversely of the running direction. Conveniently the weakened portions each are formed in the margin of the end faces. The web is constituted by the material left between the slots which start out from opposite edges.

Preferably the material of the tread surface itself is elastic and consists, for example, of polymers such as rubber. In this event it is advantageous for the spring plate to be initimately joined to the running pad by casting or molding or vulcanizing. Such a connection is facilitated by means of openings in the spring plate which permit flowing of the running pad material and, upon solidification, establish form lock between the running pad material and the spring plate at any desired location in the spring plate surface. On principle, of course, form lock is established already by the running pad material disposed between the slots. Yet the openings add further locations at which form lock is obtained. In the latter case in which the spring plate is firmly connected with the running pad material which is likewise of elastic nature the running pad proper is also deformed elastically upon assembly. This means that the inherent resiliency of the spring plate is supplemented by the natural resiliency of the running pad, a fact contributing to the elastic return to the installed form lock position in the recesses.

BRIEF DESCRIPTION OF THE DRAWING

The invention will be described further, by way of example, with reference to the accompanying drawings which show an embodiment of the invention and in which:

FIG. 1 is a sectional elevation of a running pad for use in an endless track, with a spring plate included by molding, in accordance with the invention, FIG. 2 is a top plan view of the spring plate used in the running pad according to FIG. 1, the outline of the body of the running pad being shown in discontinuous line, and FIG. 3 is a sectional elevation of the running pad according to FIG. 1 in an assembly position in which it is mounted by means of a diagrammatically indicated tool at the tread surface side of a tubular body, likewise shown in sectional elevation, of a chain link.

DETAILED DESCRIPTION

The running pad shown in FIGS. 1 and 3 has a bottom plate 1, a rubber body 3, and a spring plate 2 included by casting or molding in the rubber body. Two ends 20 and 21 of the spring plate project beyond the sides 30 and 31, respectively, of running pad 3. The tread surface of the running pad 3 is marked 32. The configuration of the spring plate 2 can best be seen in the top plan view of FIG. 2. In its central zone the spring plate 2 has two slots 4 and 5 starting at opposite front edges 24 and 25, respectively. Weakened portions 26 and 27 result between each slot end and the respective opposite front edge of the spring plate. These weakened portions are interconnected by a narrow web 6 which is readily deformable when subjected to load in the direction of arrows A—A (see also FIG. 1). Thus, upon loading in this direction, the spring plate 2 is elastically compressed so as to become smaller in its dimension 1. The load is applied by the jaws 15, 16 of an assembly tool 12 shown in FIG. 3 engaging in cut-outs or rounded recesses 10 in the ends 20 and 21 of the spring plate.

Apart from the centrally located recesses 10 the spring plate has further cut-outs or recesses 9 in its side edges. When the running pad is mounted on the tubular body, webs 18 provided on the tubular body 14 (FIGS. 2, 3) engage in those recesses so as to warrant engagement in form lock of the running pad 3 on its associated tubular body 14 in a direction transversely of the running direction of the chain.

Apertures 11 are evenly distributed in the surface of the spring plate 2 and filled by the rubber of the rubber body 3. The apertures 11 function to improve the rubber flow when the rubber is being filled into the mold and to reinforce the formlock connection between the rubber of the running pad 3 and the spring plate 2, established through the slots 4 and 5.

The assembly procedure is illustrated in FIG. 3. The spring plate 2 is compressed in the direction of arrows A by the assembly tool 12, one jaw 16 of which is pivotable to the inside about pivot point 17. In its compressed condition the running pad can then be inserted elastically into recesses 13 formed for this particular purpose in the tubular body 14. As soon as released by the assembly tool 12, the running pad springs back elastically into its original shape so as to be connected in form lock with the tubular body 14.

It is obvious that the assembly vertically to the tread surface of the endless track can be effected in very simple manner without requiring any disassembly of the tubular body from the connecting bolts, the reception openings for which are designated by reference numeral 19 in FIG. 3.

The spring plate 2 is designed to be resilient in the direction in which it is loaded, i.e. in the direction of arrows A. It can be manufactured in the most simple way by punching and can be connected to the running pad by molding or vulcanizing.

What is claimed is:

1. A running pad for an endless track for vehicles and the like, comprising
   (a) a resilient running pad body (3); and
   (b) a unitary resilient generally planar plate member (2) embedded within and extending horizontally completely through said running pad body, a pair of opposite ends (20,21) of said plate member extending outwardly beyond said pad body, said plate member containing at least one zone of weakness for permitting elastic compressional deformation of said plate inwardly in the direction between said opposite ends, whereby the plate, when in the compressed condition, may be mounted between a pair of opposed longitudinally spaced recesses (13) contained on the endless track, so that upon subsequent expansion of the plate, the running pad is mounted on the track.

2. A running pad for an endless track for vehicles and the like, comprising
   (a) a resilient running pad body (3); and
   (b) a unitary resilient generally planar plate member (2) embedded within and extending horizontally completely through said running pad body, a pair of opposite ends (20,21) of said plate member extending outwardly beyond said pad body, the opposed side edge portions of said plate member between said opposite ends each containing a weakened portion (26,27), said weakened portion being connected by a transversely extending deformable web portion (6), thereby to permit elastic compressional deformation of said plate inwardly in the direction between said opposite ends, whereby the plate, when in the compressed condition, may be mounted between a pair of opposed longitudinally spaced recesses (13) contained on the endless track, so that upon subsequent expansion of the plate, the running pad is mounted on the track.

3. Apparatus as defined in claim 2, wherein said weakened portions are defined at the ends of a pair of slots (4,5) that extend transversely inwardly of said plate member from opposite sides thereof on opposite sides of said web portion, respectively.

4. Apparatus as defined in claim 2, wherein said running pad is molded onto said resilient plate member.

5. Apparatus as defined in claim 4, wherein said plate member contains a plurality of openings (11) through which the running pad material is molded.